June 7, 1949.  A. A. D'ORAZI  2,472,148
DEVICE FOR ENLARGING PICTURES
Filed June 3, 1946  2 Sheets-Sheet 1
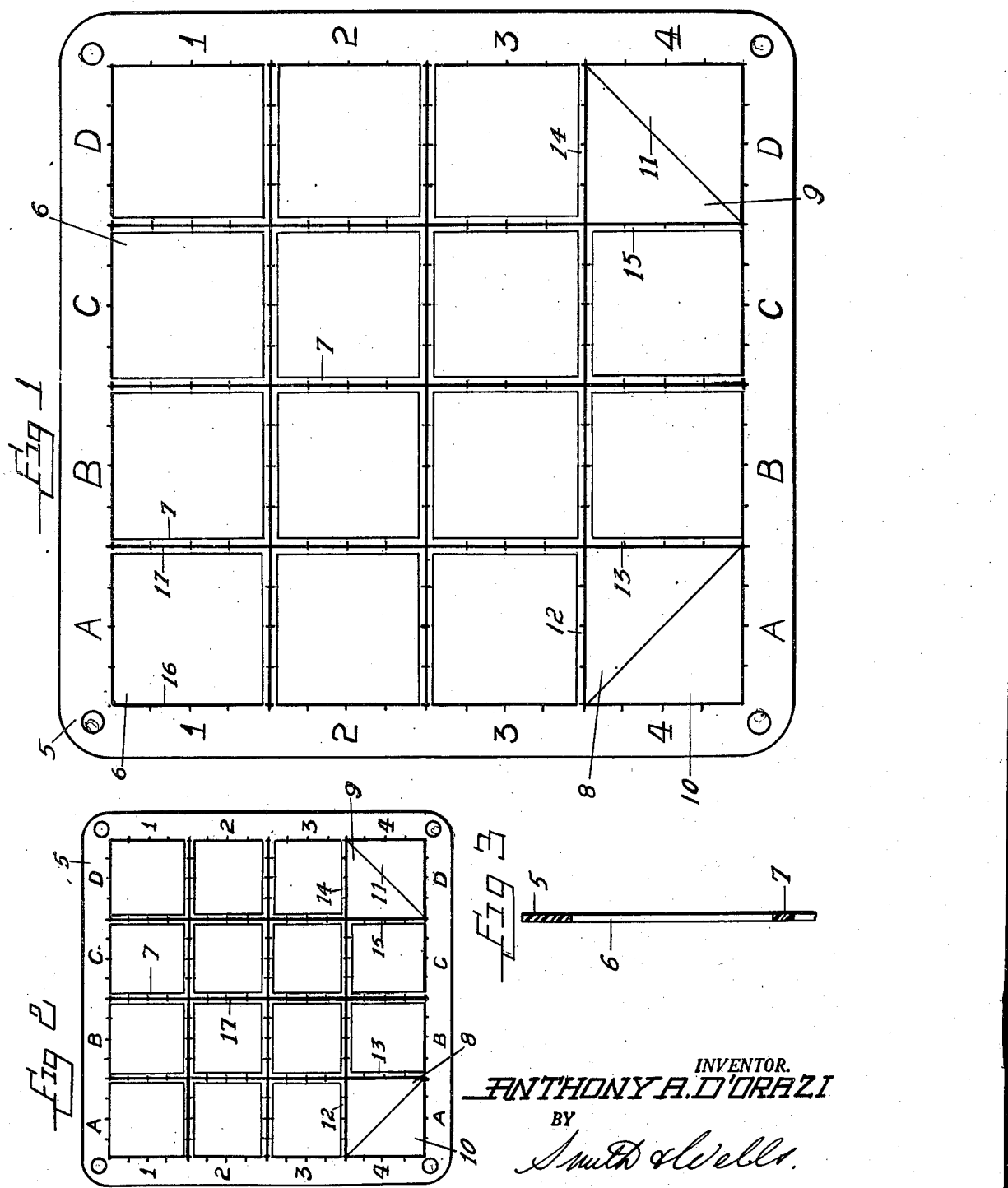

June 7, 1949.　　　　A. A. D'ORAZI　　　　2,472,148
DEVICE FOR ENLARGING PICTURES
Filed June 3, 1946　　　　　　　　　　　2 Sheets-Sheet 2
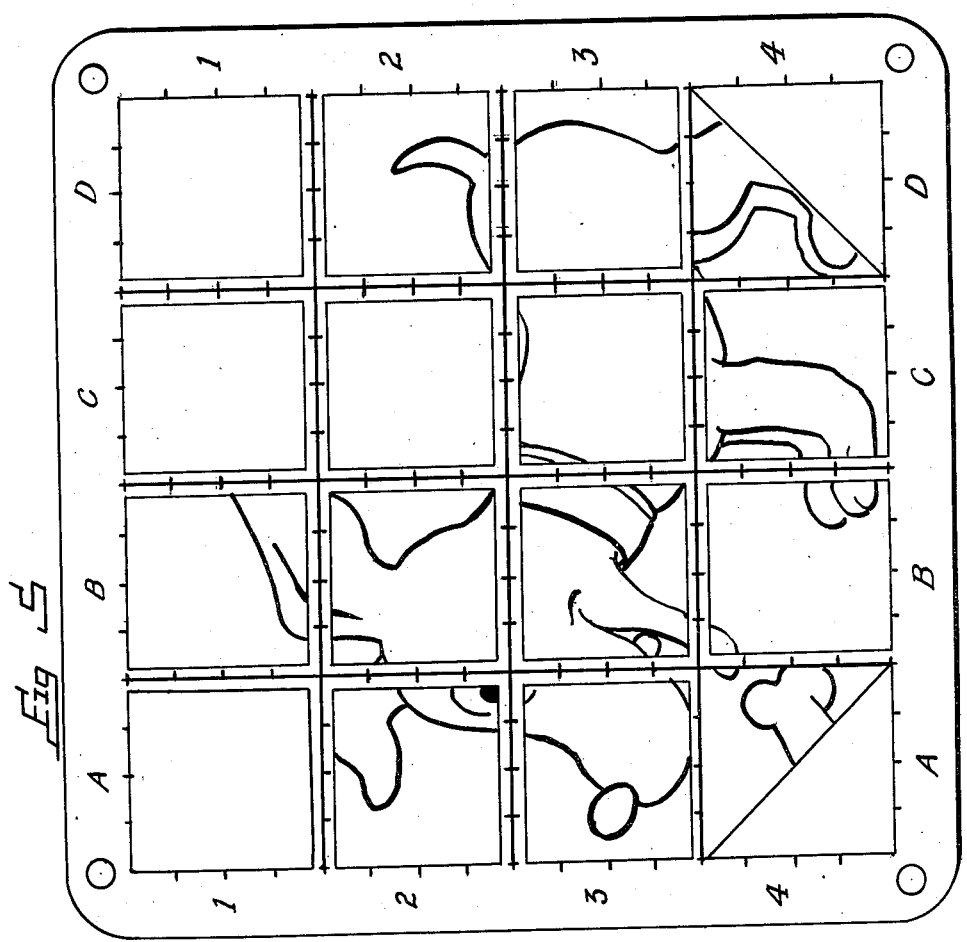
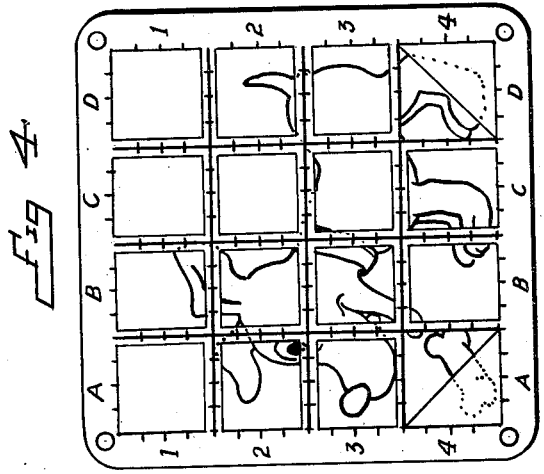
INVENTOR.
ANTHONEY A. D'ORAZI
BY
Smith & Wells.

Patented June 7, 1949

2,472,148

UNITED STATES PATENT OFFICE 2,472,148

DEVICE FOR ENLARGING PICTURES

Anthony A. D'Orazi, Spokane, Wash.

Application June 3, 1946, Serial No. 674,079

3 Claims. (Cl. 35—26)

The present invention relates to a device for enlarging pictures adapted to be used by artists or novices to copy pictures of any type the same size, or a different scale than that of the picture itself. Devices of this character as heretofore developed, usually employ some means for blocking out smaller areas of the picture to be copied so that the relative positions of the parts of the picture in the overall reproduction can easily be made the same as they are in the original. Devices of this character embody two complementary pieces of equipment, one being the device which is placed on the original picture to block out the areas and the other being the device that is placed on the drawing sheet to block out a corresponding area of the different size. To be satisfactory, the device must be easily to handle and capable of use in certain instances to make adjacent areas blocked out on the original and the copy being made meet with no intervening space for partitions. Yet the device must have sufficient stability to avoid distortion in use. I am aware that heretofore devices for blocking out areas of the pictures have been made with thin flexible elements such as strings, wires, and rubber bands, arranged in crisscross fashion to form block areas when laid on a picture. Also the practice of using transparent sheets having the lines thereon for producing a blocking out effect on the original are well known. The devices using flexible elements, however, fall short in actual use because it is not possible to avoid distortion, and the device which is placed on the copy sheet is of such nature that it seriously interferes with the making of lines on the copy.

It is the purpose of my invention to provide an enlarging device consisting of two sheet like units with rectangular and triangular areas cut out therein, one of which is a reproduction of the other on an enlarged scale so that the individual areas blocked out on the original picture are exactly reproduced on the copy sheet except for the change in size. It is also a purpose of this invention to provide a device of this character in transparent sheet material with narrow connecting portions between cut out areas with center lines and subdivision marks formed thereon so that locally adjacent markers are present on every area blocked out on the original and on the copy sheet.

It is a further object of this invention to provide the complementary device with apertures which are squares bearing a different relation in size to each other, the squares being delineated in such fashion as to enable the user to draw his lines on the copy right up to the edge of the square where accuracy in making the portion of the picture displayed in the blocked out area meet the portions displayed in adjacent areas.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 1 and Figure 2 are plan views of two complementary units for blocking out areas on an original and a copy sheet; and Figure 3 is a fragmentary sectional view taken through the edge of one of the units illustrating the manner in which the units are cut out of a transparent sheet; and Figures 4 and 5 show graphically how my invention is used.

In constructing the units illustrated in Figures 1 and 2, I prefer to use a transparent sheet material made of synthetic resin, such for example as the transparent vinyl resin materials now available. Other suitable transparent materials such as Celluloid may also be used. In making the units, a rim portion 5 is provided of sufficient width to give reasonable rigidity to the unit. Inside this rim portion I cut out a plurality of areas as indicated at 6 in the form of squares. Small partitions 7 are left between adjacent openings. The cut out area is smaller, of course, than the actual area of the square delineated, by an amount equal to the width of the partition members 7. The sheet as shown in Figures 1 and 2 is cut out so as to provide 16 squares with three partition portions running in each direction across the space between the rims at the several edges of the unit. In two corners of the unit as indicated at 8 and 9, the squares are not cut entirely out. Instead, triangular portions 10 and 11 are left in these squares. Furthermore, in these particular squares 9 and 9, the triangular opening is bordered by narrowed connecting strips 12, 13, 14, and 15, these connecting portions being half the width of the strips 7 provided throughout the rest of the unit.

In using the device for enlarging, the smaller unit shown in Figure 2 is laid on the original and secured thereto in any suitable manner such as thumb tacks through apertures shown, or by the use of scotch tape or a similar adhesive strip. The larger unit is then fastened on the copy sheet in a like manner. For general use it is advisable to have units of different sizes. For example, a smaller unit may have squares of one inch formed therein. A second unit may have squares of two inch dimensions formed thereon, a third unit may have squares of three inch dimensions, and a fourth unit may have squares of four inch dimensions. The units shown in the drawings are of one inch and two inch dimensions, giving an enlargement of two to one in both directions so that the copy will occupy four times the space of the original.

The squares which are delineated by the transparent units are measured for example from the outer line 16 at the edge of the rim 5 to a mid-line 17 on the connecting strips 7. The transparency of the units makes it possible for the user of the device to see that part of the original picture which lies directly under the strips 7. This means of course, that in the copying of the copy sheet the lines can only be run to the edges of the strips 7. However, when it is desired to connect up the lines, absolute accuracy can be obtained by shifting the units on the original and copy sheet so as to bring one of the areas 8 or 9 with the lines such as 12 and 13 adjoining the previously copied area. This permits the artists to draw in the connecting portions in the picture without leaving any gaps. The triangular portions 10 and 11 are also useful in accurately locating parts of the picture which come within the blocked area near the center thereof, the edges of partitions 12, 13, 14 and 15 at openings 8 and 9, being coincided with the lines 17, can be placed on the picture being drawn so as to expose the part of the picture that would otherwise be partly obscured by the wider interconnecting web 7. On the copy sheet a like placing of one of the triangular openings enables the artist to make an accurate copy of what is shown. An example of this use is apparent on examination of Figures 4 and 5 where in order to draw in that portion of the ear (see square A—2) that is covered by the web in Figure 4 it may be exposed by moving the triangular opening 8 into the position of the square A—2. A corresponding shift on the copy sheet would enable the artist to draw in the connecting line. If there is any question as to the exact location of a portion of the picture, that appears at the center of the square, the diagonal line at the edge of the opening 8 or 9 can be used to make the location. This for example, would locate the bend in the foot of the figure that is found in the square D—4.

The several lines such as 17 and the inner border edges of the rim 5 are all divided into equal parts by division markers so as to make it easy for the artist to judge the relative distance from a particular corner of a blocked out area to a line in a picture. These markers or indications desirably are cut in the material from which the units are made, and painted with a distinguishing color. The units are also preferably marked so that each square can be identified by a number and a letter. For example, in Figure 1, the upper left hand square would be A—1. The next square to the right would be B—1, and the next square below that would be B—2.

When one wishes to copy or enlarge a picture, using my invention no especial preparation of the picture or the copy paper is required. No lines are made on the picture to be copied or on the copy paper to disfigure either.

It is believed that the nature and advantages of this invention will be apparent from the foregoing description. Having thus described my invention, I claim:

1. A device for copying original pictures and the like comprising a sheet having a transparent rectangular rim portion and transparent criss cross narrow partitions dividing the space within the rim into a plurality of smaller open areas, said partitions having opaque center lines thereon cooperating with each other and with the inner edges of the rim to delineate adjoining squares of equal dimensions, at least one corner portion of the rim being cut out on a diagonal line between the two adjacent meeting points of the nearest partitions with the rim to provide triangular open areas.

2. In a copying means for making copies on the same or a different scale, of original pictures, maps, drawings, etc., using a pair of units for dividing the exposed original and a copy sheet into exposed areas of like shape and size when copying to the same scale, but of different sizes when enlarging or reducing, a unit comprising a flat sheet having a rectangular rim portion and transparent narrow partitions extending at right angles to said rim from the inner edges thereof and meeting at right angles within the area defined by the rim to divide the space within the rim into several open areas, the partitions and said rim having lines thereon and being so spaced that the areas defined by the lines are equal squares, the partitions adjacent two corners of the rim being half as wide as the remaining partitions and having their edges facing the rim corners coinciding with the square defining lines thereon.

3. In a copying means for making copies on the same or a different scale, of original pictures, maps, drawings, etc., using a pair of units for dividing the exposed original and a copy sheet into exposed areas of like shape and size when copying to the same scale, but of different sizes when enlarging or reducing, a unit comprising a flat sheet having a rectangular rim portion and transparent narrow partitions extending at right angles to said rim from the inner edges thereof and meeting at right angles within the area defined by the rim to divide the space within the rim into several open areas, the partitions and said rim having lines thereon and being so spaced that the areas defined by the lines are equal squares, the partitions adjacent two corners of the rim being half as wide as the remaining partitions and having their edges facing the rim corners coinciding with the square defining lines thereon, the rim inner edge at said two corners comprising a diagonal between the corners where said narrow partitions meet the rim.

ANTHONY A. D'ORAZI.

REFERENCES CITED

The following references are of record in the file of this patent:

UNITED STATES PATENTS

| Number | Name | Date |
|---|---|---|
| 574,605 | Hailes | Jan. 5, 1897 |
| 1,622,229 | Ormiston | Mar. 22, 1927 |
| 1,821,252 | Woods | Sept. 1, 1931 |
| 1,992,083 | McDonald | Feb. 19, 1935 |